US010305364B1

(12) United States Patent
Goto (10) Patent No.: US 10,305,364 B1
(45) Date of Patent: May 28, 2019

(54) POWER CONVERSION SYSTEM (71) Applicant: Mitsubishi Electric Corporation, Tokyo (JP)

(72) Inventor: Akiko Goto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/969,804

(22) Filed: May 3, 2018

(30) Foreign Application Priority Data

Nov. 28, 2017 (JP) .................... 2017-228236

(51) Int. Cl.
| H02M 1/00 | (2006.01) |
| H02M 3/158 | (2006.01) |
| H02M 3/335 | (2006.01) |
| H02M 1/08 | (2006.01) |
| H02M 7/537 | (2006.01) |

(52) U.S. Cl.
CPC .............. *H02M 1/08* (2013.01); *H02M 7/537* (2013.01); *H02M 2001/0025* (2013.01)

(58) Field of Classification Search
CPC . H02M 2001/0048; H02M 2001/0022; H02M 2001/008; H02M 3/1584; H02M 3/335
See application file for complete search history.

(56) References Cited

U.S. PATENT DOCUMENTS

| 5,635,823 A * | 6/1997 | Murakami | ......... | H03K 17/0822 |
| | | | | 323/277 |
| 5,775,310 A * | 7/1998 | Ito | .......................... | F02P 3/0552 |
| | | | | 123/630 |
| 6,812,722 B2 * | 11/2004 | Throngnumchai | ...... | G01K 7/42 |
| | | | | 374/178 |
| 7,851,866 B2 * | 12/2010 | Sakurai | .............. | H03K 17/0828 |
| | | | | 257/368 |
| 9,595,889 B2 * | 3/2017 | Li | ...................... | H02M 7/53873 |
| 9,891,640 B2 * | 2/2018 | Willkofer | ................ | H01L 23/34 |
| 2003/0072117 A1 * | 4/2003 | Maekawa | ............... | H02M 1/08 |
| | | | | 361/86 |

(Continued)

FOREIGN PATENT DOCUMENTS

| JP | 2003-009509 A | * 10/2003 |
| JP | 2009-225531 A | 10/2009 |

*Primary Examiner* — Timothy J. Dole
*Assistant Examiner* — Sisay G Tiku
(74) *Attorney, Agent, or Firm* — Studebaker & Brackett PC (57) ABSTRACT

A power conversion system includes: a plurality of power modules connected in parallel to each other; a plurality of drive circuits driving the plurality of power modules based on input signals respectively; a plurality of correction sections correcting the input signals inputted to the plurality of drive circuits based on a plurality of correction values respectively; a temperature detection section detecting operating temperatures of the plurality of power modules; and a calculation section estimating current switching characteristics of the plurality of power modules based on the measured operating temperatures and temperature dependency of switching characteristics of the plurality of power modules, and calculating the plurality of correction values based on the estimated current switching characteristics so as to reduce variations of currents flowing through the plurality of power modules.

14 Claims, 5 Drawing Sheets

(56) References Cited

U.S. PATENT DOCUMENTS

| | | | | |
|---|---|---|---|---|
| 2005/0099751 A1* | 5/2005 | Kumagai | ........... | H03K 17/0828 |
| | | | | 361/100 |
| 2014/0368150 A1* | 12/2014 | Furukawa | ............ | B62D 5/0403 |
| | | | | 318/564 |
| 2016/0204730 A1* | 7/2016 | Suzuki | ................. | H02P 29/032 |
| | | | | 318/139 |
| 2017/0093302 A1* | 3/2017 | Rowden | ................ | H02M 7/537 |

* cited by examiner

POWER CONVERSION SYSTEM

BACKGROUND OF THE INVENTION

Field

The present invention relates to a power conversion system capable of reducing variations of currents flowing through a plurality of power modules connected in parallel to each other.

Background

A power conversion system such as an inverter device is constructed of a plurality of power modules equipped with switching devices such as IGBTs or MOSFETs connected in parallel to each other and configured to achieve a necessary output capacity by causing these power modules to perform switching operations. Unbalanced current sharing caused by variations of characteristics of the plurality of power modules is known to cause not only an operation defect of a system or adverse effects on the characteristics but also a temperature rise due to current concentration, malfunctioning or reduction in the service life of the system. A method is proposed which adjusts ON/OFF timings of a plurality of switching devices connected in parallel to each other based on electrical characteristic information of the switching devices created on the basis of test results (e.g., see Patent Literature 1: JP 2009-225531 A).

SUMMARY

However, the switching characteristics of the power modules connected in parallel to each other are not determined by the characteristics of the respective switching devices alone. For example, a temperature variation may occur due to influences of an arrangement of power modules on a cooling system, which produces variations in currents flowing through the plurality of power modules in actual use, resulting in a deviation of adjustment of the switching characteristics.

The present invention has been implemented to solve the above-described problems and it is an object of the present invention to provide a power conversion system capable of reducing variations of currents flowing through a plurality of power modules connected in parallel to each other.

A power conversion system according to the present invention includes: a plurality of power modules connected in parallel to each other, a plurality of drive circuits driving the plurality of power modules based on input signals respectively; a plurality of correction sections correcting the input signals inputted to the plurality of drive circuits based on a plurality of correction values respectively; a temperature detection section detecting operating temperatures of the plurality of power modules; and a calculation section estimating current switching characteristics of the plurality of power modules based on the measured operating temperatures and temperature dependency of switching characteristics of the plurality of power modules, and calculating the plurality of correction values based on the estimated current switching characteristics so as to reduce variations of currents flowing through the plurality of power modules.

In the present invention, the current switching characteristics of the plurality of power modules are estimated based on the measured operating temperature and temperature dependency of the switching characteristics, and a plurality of correction values are calculated based on the estimated current switching characteristics so as to reduce variations of the currents flowing through the plurality of power modules. A plurality of input signals to be inputted to the plurality of drive circuits are corrected based on the plurality of correction values respectively. It is thereby possible to reduce variations of currents flowing through the plurality of power modules connected in parallel to each other.

Other and further objects, features and advantages of the invention will appear more fully from the following description.

DESCRIPTION OF EMBODIMENTS

A power conversion system according to the embodiments of the present invention will be described with reference to the drawings. The same components will be denoted by the same symbols, and the repeated description thereof may be omitted.

First Embodiment

Figure 1:
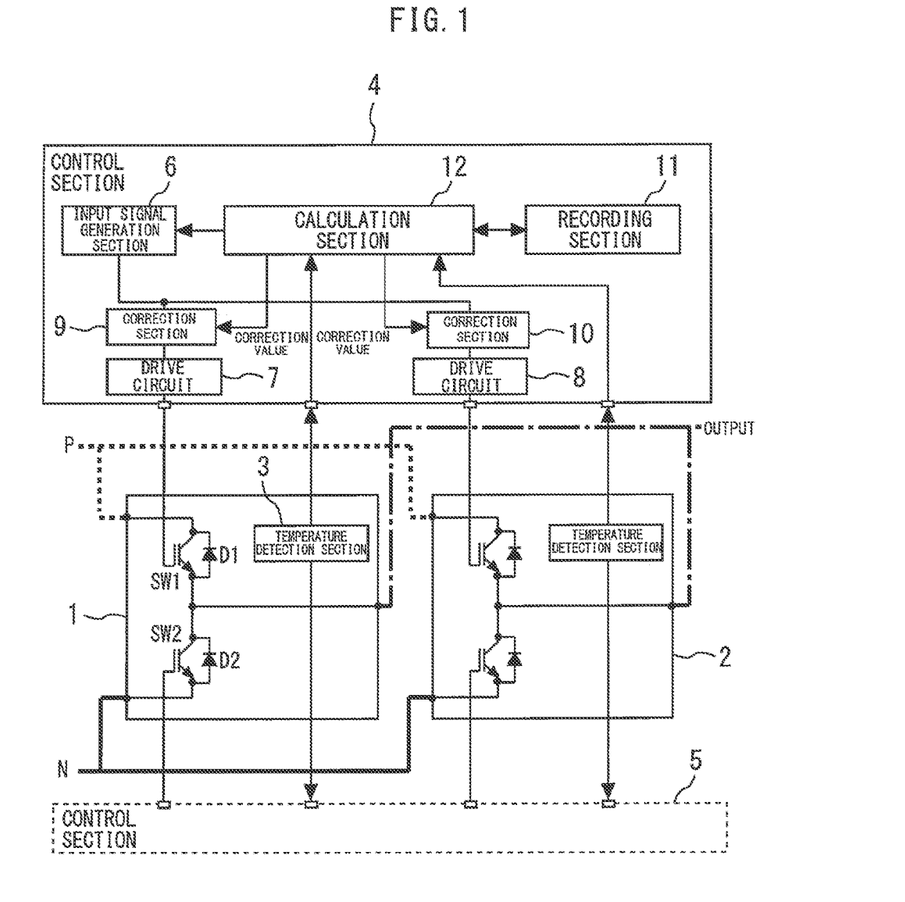
FIG. 1 is a diagram illustrating a power conversion system according to a first embodiment.

FIG. 1 is a diagram illustrating a power conversion system according to a first embodiment. A plurality of power modules 1 and 2 connected in parallel to each other operate in-phase with each other. Each of power modules 1 and 2 is a half bridge circuit including two switching devices SW1 and SW2 such as IGBTs or MOSFETs. Free-wheel diodes D1 and D2 are connected inversely parallel to the switching devices SW1 and SW2 respectively.

The power modules 1 and 2 are each provided with a temperature detection section 3 and the temperature detection section 3 outputs an operating temperature of the corresponding power module. The temperature detection section 3 is, for example, a temperature sensing diode disposed on the switching device SW1 or SW2 such as a thermistor disposed on a current path or in the vicinity of the switching device SW1 or SW2.

A control section 4 controls the switching devices SW1 of the power modules 1 and 2, and a control section 5 controls the switching devices SW2 of the power modules 1 and 2. A configuration of the control section 4 will be described below, and a similar configuration also applies to the control section 5. In the control section 4, an input signal generation section 6 such as a CPU generates an input signal. A plurality of drive circuits 7 and 8 drive the switching devices SW1 of the plurality of power modules 1 and 2 based on their respective input signals.

Figure 2:
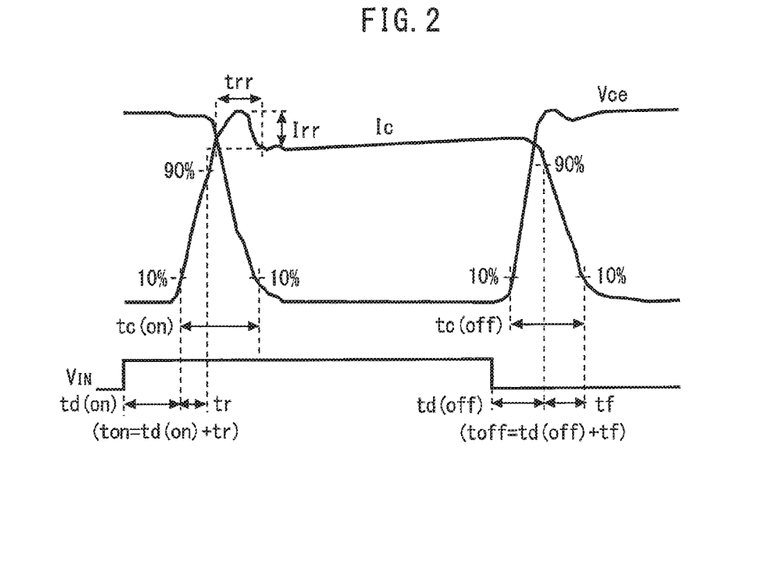
FIG. 2 is a diagram illustrating a collector current Ic and a collector-emitter voltage Vce of the switching device driven based on an input signal VIN.

FIG. 2 is a diagram illustrating a collector current Ic and a collector-emitter voltage Vce of the switching device driven based on an input signal $V_{IN}$. Reference character "tr" denotes a rising time, which is also referred to as an elevating time, representing a time period required for a flowing current to increase from 10% to 90% when, for example, an ON-state flowing current is assumed to be 100%. Reference character "tf" denotes a falling time, which is also referred to as a lowering time, representing a time period required for a flowing current to decrease from 90% to 10%. Reference character "tc (on)" denotes a time period required to turn on, representing a time period required after the flowing current increases to 10% until an applied voltage decreases down to 10%, where, for example, an ON-state flowing current is assumed to be 100% and an OFF-state applied voltage is assumed to be 100%. Reference character "tc (off)" denotes a time period required to turn off, representing, for example, a time period required after the applied voltage increases to 10% until the flowing current decreases down to 10%. Reference character "td (on)" denotes a turn-on delay time, representing, for example, a time period required after an input signal turns ON until the flowing current flows by 10%. Reference character "td (off)" denotes a turn-off delay time, representing, for example, a time period required after the input signal turns OFF until the flowing current decreases down to 90%. Reference character "ton" denotes a total value of td (on) and tr. Reference character "toff" denotes a total value of td (off) and tf.

A plurality of correction sections 9 and 10 correct input signals inputted to the plurality of drive circuits 7 and 8 based on a plurality of correction values respectively. The correction sections 9 and 10 are delay circuits or the like that advance or delay an input signal in accordance with the correction values.

A recording section 11 records inspection results of the switching characteristics of the plurality of power modules 1 and 2 subjected to shipment inspections and inspection temperatures which are operating temperatures during the inspections as shipment inspection results. The recording section 11 also records matrix data showing a correlation between the switching characteristics and the operating temperatures as a calculation table. Note that the calculation table can be created using typical switching characteristic information plotted with operating temperatures and flowing currents provided by a power module maker. Without being limited to this, the calculation table may also be created based on results of confirming temperature dependency of switching characteristics in actual use of the power modules mounted on the actual power conversion system within ranges of expected operating temperatures, applied voltages and flowing currents.

Examples of common shipment inspections include a DC current flowing test (static characteristic evaluation), insulation test, switching test under single-pulse or multi-pulse current flowing on an L load half bridge circuit. The inspected switching characteristics are at least one of tr, tf, tc (on), tc (off), td (on), td (off), ton and toff. The power modules are each assigned an identification number such as a lot number, running number and thereby shipped in a one-to-one correspondence with several values of the shipment inspection results.

A calculation section 12 estimates temperature dependency of the switching characteristics of the plurality of power modules 1 and 2 based on the shipment inspection results and estimates the current switching characteristics of the plurality of power modules 1 and 2 based on the measured operating temperature and the estimated temperature dependency of the switching characteristics. Note that since the temperature dependency of the switching characteristics of each of power modules 1 and 2 is specific to each power module and invariable, these may be saved in the recording section 11 to shorten the calculation time.

Figure 3:
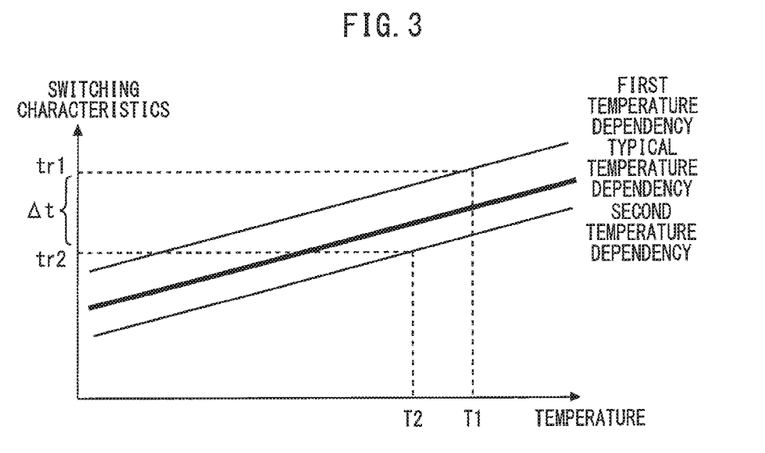
FIG. 3 is a diagram illustrating a method of estimating the switching characteristic.

FIG. 3 is a diagram illustrating a method of estimating the switching characteristic. If the switching characteristic of the power module 1 has first temperature dependency and the operating temperature of the power module 1 is T1, the current switching characteristic of the power module 1 is estimated to be a rising time tr1. Similarly, if the switching characteristic of the power module 2 has second temperature dependency and the operating temperature of the power module 2 is T2, the current switching characteristic of the power module 2 is estimated to be a rising time tr2.

Figure 4:
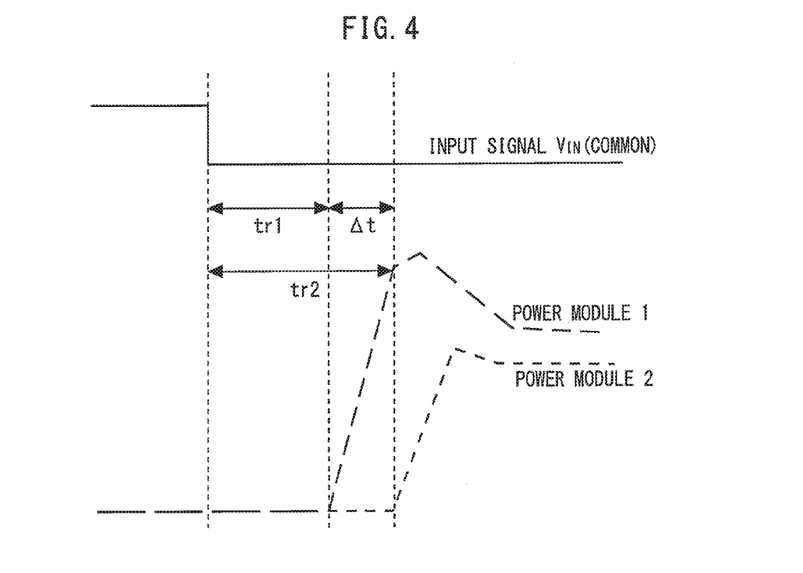
FIG. 4 is a diagram illustrating a flowing current when ON timings of the two power modules do not coincide with each other.

FIG. 4 is a diagram illustrating a flowing current when ON timings of the two power modules do not coincide with each other. A common input signal $V_{IN}$ is inputted to the two power modules, but since their rising times tr1 and tr2 are different, ON timings do not coincide with each other. In this case, a flowing current transiently and intensively flows through the power module which is started earlier. After that, when the other power module is started, the flowing current is distributed between the two power modules according to an extent of opening of gates of the modules, an inductance component of an external or internal wiring, capacity components of the modules or the like. In this case, di/dt and dv/dt fluctuate. Transient current concentration may cause greater switching loss than expected and repetition of such loss may cause concern about a temperature rise and an extreme reduction of the service life of the power modules.

Therefore, the calculation section 12 aligns switching ON/OFF timings of the plurality of power modules 1 and 2 based on the estimated current switching characteristics and calculates a plurality of correction values so as to reduce variations of currents flowing through the plurality of power modules 1 and 2. Here, a difference Δt between the estimated rising times of the power modules 1 and 2 is used as a correction value.

Figure 5:
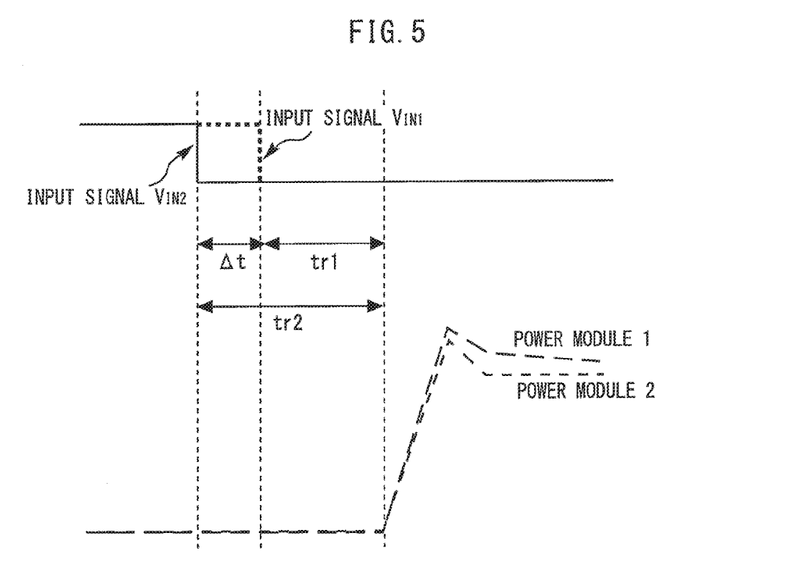
FIG. 5 is a diagram illustrating a flowing current when ON timings of the two power modules are aligned.

FIG. 5 is a diagram illustrating a flowing current when ON timings of the two power modules are aligned. The ON timings are aligned by adjusting delay amounts of input signals $V_{IN1}$ and $V_{IN2}$ to be inputted to the two power modules respectively. After both of the two power modules are placed in an ON stationary state, the flowing current is distributed so that a voltage drop during energization of both modules becomes constant. This prevents the flowing current from concentrating on one power module, and can thereby prevent an increase in switching loss, an accompanying temperature rise of the switching devices and an extreme reduction of the service life. Furthermore, since excessive concentration of the flowing current can be suppressed, the variation of device temperature also decreases and the variations of di/dt and dv/dt also decrease as a consequence.

When the calculation section 12 is of a timer type, the calculation section 12 reads temperature information again every constant periods and recalculates a correction value. When the calculation section 12 is of an event type, the calculation section 12 recalculates a correction value at timing at which an operating temperature increases or decreases by a certain amount, for example, 5° C. from the previous calculation. Since the recalculated correction value needs to be applied in an OFF state or in a situation in which the flowing current is 0 A or the like, a process is performed whereby an old correction value held is discarded for an application of the next or an arbitrary input signal so as to be replaced by a new correction value. Furthermore, when the switching characteristic of each power module is estimated at a certain operating temperature and a correction value is calculated, the correction value may be held for a certain time period and input signals such as PWM (pulse width modulation) signals may be continuously corrected in a simplified manner. This allows switching characteristics during actual use to be fed back without increasing a calculation load.

As described above, in the present embodiment, the current switching characteristics of the plurality of power modules 1 and 2 are estimated based on the measured operating temperature and temperature dependency of the switching characteristics, and a plurality of correction values are calculated based on the estimated current switching characteristics so as to reduce variations of the currents flowing through the plurality of power modules 1 and 2. A plurality of input signals to be inputted to the plurality of drive circuits 7 and 8 are corrected based on the plurality of correction values respectively. It is thereby possible to reduce variations of currents flowing through the plurality of power modules 1 and 2 connected in parallel to each other.

The switching characteristics fluctuate according to an operating temperature, applied voltage, flowing current, circuit conditions or the like. However, compared to fluctuations according to an applied voltage and flowing current, greater fluctuations are generally attributable to circuit conditions such as routing of main electrodes or signal wiring and temperatures. Therefore, in the case of a power conversion system such as an inverter with fixed ranges of applied voltage and flowing current, it is possible to estimate the current switching characteristics of the power modules based on the measured operating temperature and temperature dependency of the switching characteristics.

When the switching characteristics, fluctuations of which are large relative to that of the flowing current or applied voltage are used as shipment inspection results, there are concerns that the correction accuracy may deteriorate when the flowing current or applied voltage fluctuates considerably at startup or during high load operation or the like. Therefore, the switching characteristics are preferably at least one of tr, tf, tc (on), tc (off), td (on), td (off), ton and toff. Since fluctuations of these switching times caused by a current or voltage are small, it is possible to correct switching timing more accurately by simple calculations and improve current unbalance. Note that switching times generally have small current dependency, but the current dependency differs depending on the structure of a switching device such as an IGBT or MOSFET, and the material such as Si or SiC. Therefore, it is necessary to select a shipment inspection result according to the characteristics. For example, in the case of a power module equipped with an IGBT of a Si material, td (on), td (off), ton, toff or the like generally has small current dependency and is suitable for shipment inspection results. On the other hand, in the case of a power module equipped with a drive circuit, since td (on), td (off), ton or toff includes a delay time of the drive circuit, such a power module has an advantage that corrections can be made with characteristic variations taken into consideration.

The calculation section 12 is implemented by a processing circuit such as a CPU or a system LSI that executes a program stored in memory. Furthermore, a plurality of processing circuits may operate in cooperation to execute the above-described functions. An input signal may be corrected by software using the calculation section 12 but correcting an input signal by hardware through the correction sections 9 and 10 can further reduce the load and the number of output pins of the calculation section 12.

Variations of a flowing current are generated under the influence of an arrangement of the switching devices SW1 and SW2 in the power modules 1 and 2, arrangement of the power modules 1 and 2 connected in parallel to each other, position of the power supply or electrolytic capacitor or the like relative to a DC voltage source, length or routing of main wiring or outside wiring such as signal wiring or the like. Furthermore, variations of switching characteristics are also generated under the influence of temperature variations due to an arrangement of power modules on a cooling system. In such a case, it is preferable to improve the arrangement of the switching devices or the power modules, routing of signal wiring or the like. However, there may be cases where uniform arrangement is not possible due to apparatus constraints. Thus, it is preferable to confirm effects on the switching characteristics of the arrangement of the switching devices or power modules, routing of wiring or the like through evaluations of initial products of the power conversion system or the like, and reflect the effects in the calculation table. By superimposing these effects on the characteristics of each power module estimated based on the operating temperature and the shipment inspection results, it is possible to more accurately calculate a correction value of each power module.

When, for example, a three-phase inverter circuit is constructed by connecting two power modules having six switching devices in parallel to each other, correction values of the switching devices with the respective phases are deduced using a common calculation table and corrections are made according to the position relative to the main electrode and circuit conditions such as routing of signal wiring. Therefore, even when the shipment inspection result and the operating temperature are the same, correction values may vary from one phase to another.

As the power modules 1 and 2, power modules with one device or six devices or power modules for a single-phase inverter or a three-phase inverter circuit or the like may be used. Protective circuits for overheat protection, short circuit protection, supply voltage reduction protection or the like may be provided. Although the input signal generation section 6 is provided separately from the calculation section 12, an input signal may be generated by software using the calculation section 12 and the recording section 11. Although a drive circuit is connected for each switching device, the plurality of switching devices in one power module or the plurality of power modules 1 and 2 may be switched by a common drive circuit such as an LVIC. An input signal may be level-shifted using a drive circuit such as an HVIC and the P side (high side) and the N side (low side) of the same phase or a plurality of phases such as all phases of the P side may be switched using a common drive circuit.

Second Embodiment

Figure 6:
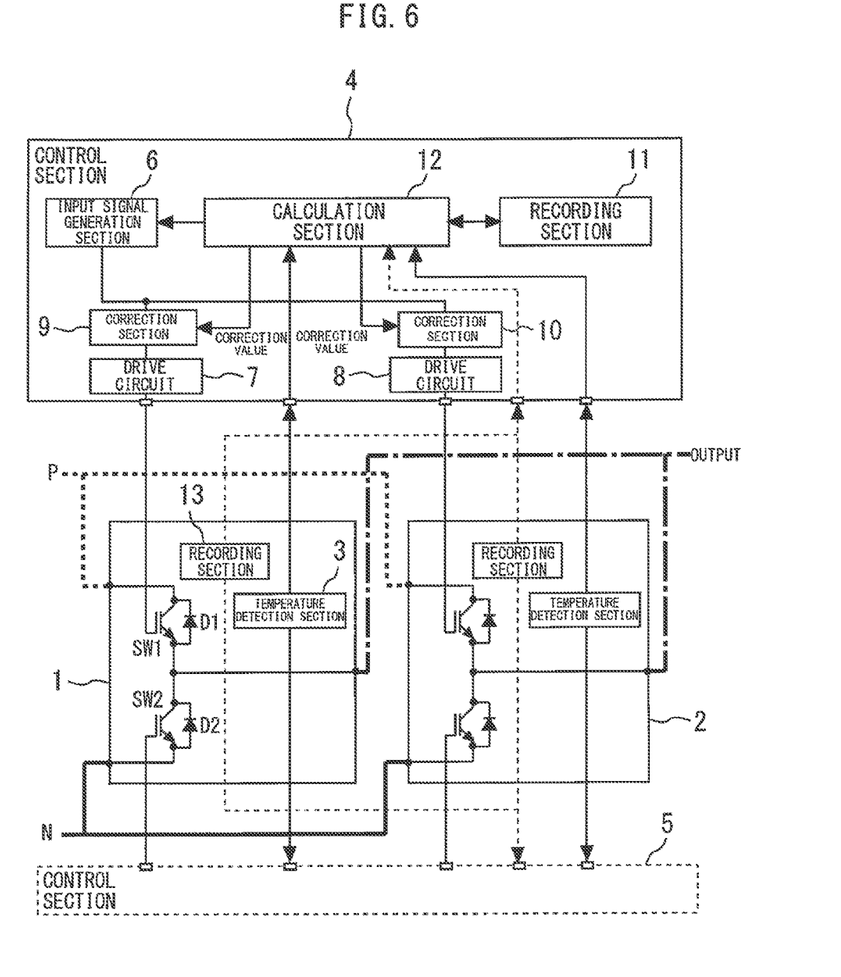
FIG. 6 is a diagram illustrating a power conversion system according to a second embodiment.

FIG. 6 is a diagram illustrating a power conversion system according to a second embodiment. In the present embodiment, the power modules 1 and 2 are each provided with a recording section 13. The recording section 13 records a shipment inspection result of the corresponding power module. This easily makes sure to bring the power modules into one-to-one correspondence with their shipment inspection results. The control section 4 reads the shipment inspection results from the power modules 1 and 2 upon the initial starting or at every start, and records the shipment inspection results in the recording section 11. A product assembling step can be simplified because the shipment inspection results of the respective power modules 1 and 2 need not be inputted to the recording section 11 of the control section 4 in assembling the power conversion system. Furthermore, the power modules can be replaced or changed as field maintenance at the installation place after shipment of the power conversion system. In that case, the system may be reset and read again after the maintenance. Note that when the shipment inspection results are held in the recording section 11 of the control section 4 upon the initial starting, the system may be reset and read again after field maintenance.

Third Embodiment

Figure 7:
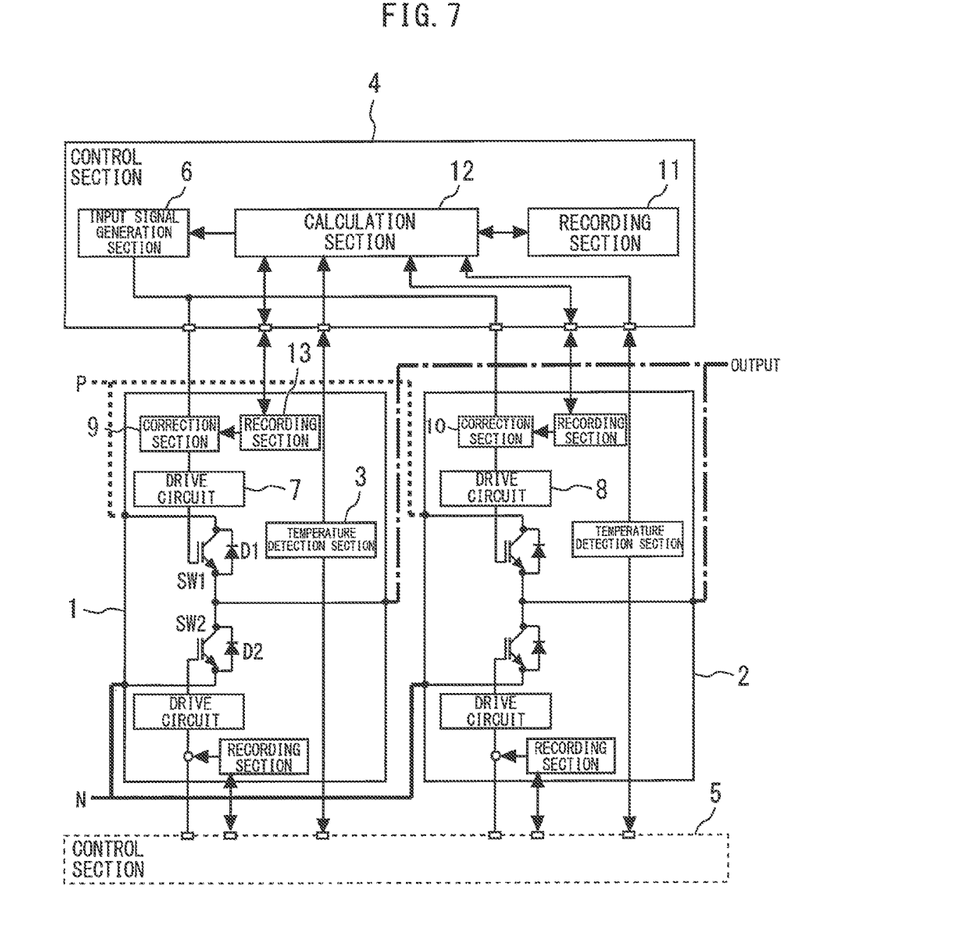
FIG. 7 is a diagram illustrating a power conversion system according to a third embodiment.

FIG. 7 is a diagram illustrating a power conversion system according to a third embodiment. In the present embodiment, the power module 1 is provided with not only the recording section 13 but also a drive circuit 7 such as an HVIC or LVIC and a correction section 9. Similarly, the power module 2 is provided with a drive circuit 8 and a correction section 10. The recording section 13 records not only shipment inspection results but also calculated correction values.

At switching OFF timing, the drive circuit 7 reads a correction value from the recording section 13 every time or once every several times. The drive circuit 7 selects a delay circuit of the correction section 9 according to the correction value and the correction section 9 corrects input signals with a specific phase or all phases. Note that the drive circuit 7 may also read a correction value at timing at which the correction value is rewritten or at timing at which all the three phases of the input signals are turned OFF according to an instruction from the calculation section 12 of the control section 4.

Since input signals are corrected in the power modules 1 and 2, the input signals applied to the power modules 1 and 2 are made common. Since this makes routing of wiring in the control section 4 simpler, the design of the control section 4 becomes simple and it is possible to use an inexpensive wiring board and signal wiring as the control section 4.

Note that a control circuit that selects a delay circuit of the correction section 9 may be provided in the power device. When the correction value is changed due to a change in the temperature condition or the like, a new correction value may be overwritten at the same address of the recording section 13. It is possible to read data from and write data to the recording section 13 from the calculation section such as the microcomputer, CPU or DSP of the control section 4 outside the power modules 1 and 2. At least one of the correction section 9 and the recording section 13 may be equipped in the drive circuit 7, which makes it possible to improve accuracy and reduce a transmission delay time.

The correction section 9 is not limited to a delay circuit that corrects an input signal by hardware, but may be a microcomputer that corrects an input signal by software. When an input signal is corrected by software, since the input signal corrected for each of the power modules 1 and 2 is calculated and outputted in the first and second embodiments, the number of outputs of the microcomputer increases according to the number of power modules connected in parallel to each other. On the other hand, in the third embodiment, since the common input signal is applied to the power modules 1 and 2, there is no need to increase the number of outputs of the microcomputer or the like. For example, in the case of a three-phase PWM control system in which two power modules, each including 6 devices, are connected in parallel to each other and driven, the number of necessary outputs of the microcomputer is 6 devices× 2=12 pins in the first and second embodiments, whereas it is 6 pins in the third embodiment. Thus, the design of substrate wiring becomes simpler and a more inexpensive PCB substrate can be used.

Without being limited to the configuration in which the recording section 13 and the drive circuit 7 are connected to each of the switching devices SW1 and SW2, a configuration may be adopted in which a common recording section and a common drive circuit are connected to a plurality of switching devices or a plurality of phases. A configuration may also be adopted in which an input signal is level-shifted by a drive circuit such as an HVIC, and the P side (high side) and the N side (low side) of the same phase or a plurality of phases such as all phases of the P side are switched using a common memory and a common drive circuit.

Note that the switching devices SW1 and SW2 are not limited to ones formed of silicon, but may also be formed of a wide band-gap semiconductor having a greater band-gap than that of silicon. The wide band-gap semiconductor is, for example, silicon carbide, nitride gallium-based material or diamond. An device formed of such a wide band-gap semiconductor has high withstand voltage or high allowable current density, and can thereby be downsized. Using this downsized device also makes it possible to downsize and highly integrate a power conversion system incorporating this device. In addition, since the device exhibits high heat resistance, it is possible to downsize radiator fins of a heat sink, replace a water-cooling section with an air-cooling system, and thereby further downsize the power conversion system. Moreover, since the device exhibits low power loss and high efficiency, it is possible to increase efficiency of the power conversion system.

Furthermore, when the power module is driven, conduction loss and switching loss occur, and temperature rises. As the temperature rises, electric resistance increases causing less current to flow, and so current unbalance among a plurality of power modules connected in parallel to each other tends to be improved. On the other hand, a power module equipped with a silicon carbide switching device has significantly lower conduction loss and switching loss than those of a silicon switching device. For example, in an inverter operation using power modules of the same current rating, an inverter using a silicon carbide switching device has switching loss of approximately 30% of that in an inverter using a silicon switching device and has a smaller temperature rise than that of the inverter using a silicon switching device. Therefore, when the silicon carbide switching device is used, an improvement of current unbalance caused by temperatures cannot be expected, and so it is necessary to reduce variations of currents flowing through a plurality of power modules as in the case of the present embodiment.

Furthermore, there may also be a case where as the temperature rises, the electric resistance of the switching devices decreases, which facilitates the current flow. In this case, current concentration is more likely to occur, and so an improvement cannot be expected either due to the temperature rise, and it is therefore necessary to reduce variations of currents flowing through the plurality of power modules as in the case of the present embodiment.

A silicon carbide switching device using a new material and structure, compared to a silicon switching device, has insufficient technology and know-how accumulation such as quality stability of materials such as wafers, manufacturing constraints and a chip structure. For this reason, there are concerns about variations of stationary characteristics or switching characteristics. Correcting variations of switching characteristics according to the present embodiment makes it possible to relax the product standard of power modules, lead to an improvement of manufacturing yield and stable production, provide and use more inexpensive silicon carbide power modules.

Obviously many modifications and variations of the present invention are possible in the light of the above teachings. It is therefore to be understood that within the scope of the appended claims the invention may be practiced otherwise than as specifically described.

The entire disclosure of Japanese Patent Application No. 2017-228236, filed on Nov. 28, 2017 including specification, claims, drawings and summary, on which the Convention priority of the present application is based, is incorporated herein by reference in its entirety.

The invention claimed is:

1. A power conversion system comprising:
a plurality of power modules connected in parallel to each other;
a plurality of drive circuits driving the plurality of power modules based on input signals respectively;
a plurality of correction sections correcting the input signals inputted to the plurality of drive circuits based on a plurality of correction values respectively;
a temperature detection section detecting operating temperatures of the plurality of power modules; and
a calculation section estimating current switching characteristics of the plurality of power modules based on the detected operating temperatures and temperature dependencies of switching characteristics of the plurality of power modules, and calculating the plurality of correction values based on the estimated current switching characteristics so as to reduce variations of currents flowing through the plurality of power modules, wherein
the switching characteristic is at least one of a rising time, a falling time, a time period required to turn on, a time period required to turn off, a turn-on delay time, a turn-off delay time, a total value of a turn-on delay time and a rising time, and a total value of a turn-off delay time and a falling time.

2. The power conversion system according to claim 1, further comprising a recording section recording inspection results of switching characteristics of the plurality of power modules and inspection temperatures as shipment inspection results,
wherein the calculation section estimates the temperature dependencies of the switching characteristics of the plurality of power modules based on the shipment inspection results.

3. The power conversion system according to claim 2, wherein the recording section includes a plurality of recording sections provided in the plurality of power modules respectively and recording the shipment inspection results of the plurality of power modules respectively.

4. The power conversion system according to claim 3, wherein the plurality of drive circuits and the plurality of correction sections are provided in the plurality of power modules respectively, and
the plurality of recording sections records the plurality of calculated correction values respectively.

5. The power conversion system according to claim 4, wherein the plurality of power modules includes a plurality of switching devices made of a wide-band-gap semiconductor respectively.

6. The power conversion system according to claim 3, wherein the plurality of power modules includes a plurality of switching devices made of a wide-band-gap semiconductor respectively.

7. The power conversion system according to claim 2, wherein the plurality of power modules includes a plurality of switching devices made of a wide-band-gap semiconductor respectively.

8. The power conversion system according to claim 1, wherein the plurality of power modules includes a plurality of switching devices made of a wide-band-gap semiconductor respectively.

9. A power conversion system comprising:
a plurality of power modules connected in parallel to each other;
a plurality of drive circuits driving the plurality of power modules based on input signals respectively;
a plurality of correction sections correcting the input signals inputted to the plurality of drive circuits based on a plurality of correction values respectively;
a temperature detection section detecting operating temperatures of the plurality of power modules;
a calculation section estimating current switching characteristics of the plurality of power modules based on the detected operating temperatures and temperature dependencies of switching characteristics of the plurality of power modules, and calculating the plurality of correction values based on the estimated current switching characteristics so as to reduce variations of currents flowing through the plurality of power modules; and
a recording section recording inspection results of switching characteristics of the plurality of power modules and inspection temperatures as shipment inspection results, wherein
the calculation section estimates the temperature dependencies of the switching characteristics of the plurality of power modules based on the shipment inspection results.

10. The power conversion system according to claim 9, wherein the recording section includes a plurality of recording sections provided in the plurality of power modules respectively and recording the shipment inspection results of the plurality of power modules respectively.

11. The power conversion system according to claim 10, wherein the plurality of drive circuits and the plurality of correction sections are provided in the plurality of power modules respectively, and
the plurality of recording sections records the plurality of calculated correction values respectively.

12. The power conversion system according to claim 11, wherein the plurality of power modules includes a plurality of switching devices made of a wide-band-gap semiconductor respectively.

13. The power conversion system according to claim 10, wherein the plurality of power modules includes a plurality of switching devices made of a wide-band-gap semiconductor respectively.

14. The power conversion system according to claim 9, wherein the plurality of power modules includes a plurality of switching devices made of a wide-band-gap semiconductor respectively.

* * * * *